US009167418B1

(12) United States Patent
Tuluca (10) Patent No.: US 9,167,418 B1
(45) Date of Patent: Oct. 20, 2015

(54) METHOD AND APPARATUS FOR CONTROLLING INPUT TO A MOBILE COMPUTING DEVICE LOCATED INSIDE A VEHICLE (71) Applicant: Invictus Technology Group, Inc., Pound Ridge, NY (US)

(72) Inventor: Luciano Tuluca, Pound Ridge, NY (US)

(73) Assignee: Invictus Technology Group, Inc., Pound Ridge, NY (US)

( * ) Notice: Subject to any disclaimer, the term of this patent is extended or adjusted under 35 U.S.C. 154(b) by 0 days.

(21) Appl. No.: 14/746,050

(22) Filed: Jun. 22, 2015

(51) Int. Cl.
*H04W 8/22* (2009.01)
*G07C 5/00* (2006.01)
*H04W 4/02* (2009.01)

(52) U.S. Cl.
CPC ............... *H04W 8/22* (2013.01); *G07C 5/008* (2013.01); *H04W 4/027* (2013.01)

(58) Field of Classification Search
USPC ......................................................... 701/301
See application file for complete search history.

(56) References Cited

U.S. PATENT DOCUMENTS

| 6,687,497 B1 | 2/2004 | Parvulescu et al. |
| 6,690,940 B1 | 2/2004 | Brown et al. |
| 6,771,946 B1 | 8/2004 | Oyaski |
| 7,065,349 B2 | 6/2006 | Nath et al. |
| 7,123,874 B1 | 10/2006 | Brennan |
| 7,181,229 B2 | 2/2007 | Singh et al. |
| 7,236,776 B2 | 6/2007 | Nath et al. |
| 7,505,784 B2 | 3/2009 | Barbera |
| 7,653,385 B2 | 1/2010 | Arend et al. |
| 7,711,355 B1 | 5/2010 | Krueger et al. |
| 7,856,203 B2 | 12/2010 | Lipovski |
| 7,898,428 B2 | 3/2011 | Dietz et al. |
| 7,949,296 B2 | 5/2011 | Arend et al. |
| 7,957,773 B2 | 6/2011 | Chua et al. |
| 8,044,794 B2 | 10/2011 | Chauncey et al. |
| 8,140,358 B1 * | 3/2012 | Ling et al. ............ 705/4 |
| 8,145,199 B2 | 3/2012 | Tadayon et al. |
| 8,200,291 B2 | 6/2012 | Steinmetz et al. |
| 8,204,649 B2 | 6/2012 | Zhou et al. |
| 8,217,800 B2 | 7/2012 | Vander Veen et al. |

(Continued)

FOREIGN PATENT DOCUMENTS

| EP | 2099203 A1 | 9/2009 |
| EP | 2216970 A1 | 8/2010 |

(Continued)

*Primary Examiner* — Thomas Tarcza
*Assistant Examiner* — Alex C Dunn
(74) *Attorney, Agent, or Firm* — Sorell, Lenna & Schmidt, LLP (57) ABSTRACT

A wireless transmission system and method is provided for use in a vehicle having an on-board diagnostic (OBD) system configured to provide vehicle speed data and engine operation status data. A transmission apparatus is interfaceable with the on-board diagnostic system. The transmission apparatus is configured to transmit a wireless signal as specified by Bluetooth criteria. A mobile computing device has an input device, a GPS module, and a wireless transceiver configured to receive the wireless signal in accordance with Bluetooth criteria and determine a signal level thereof. The GPS module is configured to provide GPS data as determined by received GPS signals. The mobile computing device operates in accordance with a method for determining is the mobile computing device is with a driver's seating area and disables the input device if the vehicle speed is at or above a threshold value.

14 Claims, 6 Drawing Sheets

(56) References Cited

U.S. PATENT DOCUMENTS

| | | |
|---|---|---|
| 8,270,933 B2 | 9/2012 | Riemer et al. |
| 8,280,438 B2 | 10/2012 | Barbera |
| 8,295,854 B2 | 10/2012 | Osann, Jr. |
| 8,315,617 B2 | 11/2012 | Tadayon et al. |
| 8,354,937 B2 | 1/2013 | Vander Veen et al. |
| 8,380,161 B2 | 2/2013 | Ewell, Jr. |
| 8,385,880 B2 | 2/2013 | Ewell, Jr. et al. |
| 8,401,578 B2 | 3/2013 | Inselberg |
| 8,401,589 B2 | 3/2013 | Liu et al. |
| 8,417,268 B1 | 4/2013 | Halferty et al. |
| 8,428,973 B1 | 4/2013 | Hopkins, III |
| 8,437,729 B2 | 5/2013 | Ewell, Jr. et al. |
| 8,442,511 B2 | 5/2013 | Woods et al. |
| 8,457,692 B2 | 6/2013 | Fyke et al. |
| 8,461,973 B2 | 6/2013 | Reed et al. |
| 8,478,237 B1 | 7/2013 | Stenta |
| 8,526,973 B2 | 9/2013 | Thomson |
| 8,547,214 B2 | 10/2013 | Basson et al. |
| 8,594,705 B2 | 11/2013 | Osann, Jr. |
| 8,644,812 B2 | 2/2014 | Raviv |
| 8,706,143 B1 | 4/2014 | Elias |
| 8,731,530 B1 | 5/2014 | Breed et al. |
| 8,738,005 B2 | 5/2014 | Williams et al. |
| 8,744,678 B2 | 6/2014 | Smith et al. |
| 8,781,457 B2 | 7/2014 | Randazzo et al. |
| 8,781,491 B2 | 7/2014 | Wright et al. |
| 8,793,034 B2 * | 7/2014 | Ricci .................. 701/1 |
| 8,825,000 B2 | 9/2014 | Kemper |
| 8,838,088 B1 | 9/2014 | Henn et al. |
| 8,855,682 B2 | 10/2014 | Osann, Jr. |
| 8,942,692 B2 | 1/2015 | Randazzo et al. |
| 8,971,927 B2 | 3/2015 | Zhou et al. |
| 2004/0077339 A1 | 4/2004 | Martens |
| 2005/0255874 A1 | 11/2005 | Stewart-Baxter et al. |
| 2009/0111422 A1 | 4/2009 | Bremer et al. |
| 2009/0215466 A1 | 8/2009 | Ahl et al. |
| 2009/0221279 A1 | 9/2009 | Rutledge |
| 2009/0224931 A1 | 9/2009 | Dietz et al. |
| 2010/0009626 A1 | 1/2010 | Farley |
| 2010/0041383 A1 | 2/2010 | Fournier |
| 2010/0113073 A1 | 5/2010 | Schlesener et al. |
| 2010/0227601 A1 | 9/2010 | Walton et al. |
| 2010/0279626 A1 | 11/2010 | Bradley et al. |
| 2010/0289633 A1 | 11/2010 | Aryal et al. |
| 2010/0297929 A1 | 11/2010 | Harris |
| 2011/0065375 A1 | 3/2011 | Bradley |
| 2011/0092159 A1 | 4/2011 | Park et al. |
| 2011/0111724 A1 | 5/2011 | Baptiste |
| 2011/0130132 A1 | 6/2011 | Lipovski |
| 2011/0223939 A1 | 9/2011 | Osann, Jr. |
| 2012/0021717 A1 | 1/2012 | Schmidt |
| 2012/0046020 A1 | 2/2012 | Tomasini |
| 2012/0172014 A1 | 7/2012 | Smith |
| 2012/0176232 A1 | 7/2012 | Bantz et al. |
| 2012/0196544 A1 | 8/2012 | Bolingbroke |
| 2012/0214408 A1 | 8/2012 | Chronister |
| 2012/0214463 A1 | 8/2012 | Smith et al. |
| 2012/0225673 A1 | 9/2012 | Juhasz |
| 2012/0231773 A1 | 9/2012 | Lipovski |
| 2013/0176100 A1 | 7/2013 | White et al. |
| 2013/0189964 A1 | 7/2013 | Thompson |
| 2013/0295900 A1 | 11/2013 | Hood |
| 2013/0295913 A1 * | 11/2013 | Matthews et al. .......... 455/420 |
| 2013/0303075 A1 | 11/2013 | Smiley et al. |
| 2013/0336094 A1 | 12/2013 | Gruteser et al. |
| 2014/0057610 A1 | 2/2014 | Olincy et al. |
| 2014/0113619 A1 | 4/2014 | Tibbitts et al. |
| 2014/0213234 A1 | 7/2014 | Inselberg |
| 2014/0235159 A1 | 8/2014 | Komistek |
| 2014/0235216 A1 | 8/2014 | Lamont |
| 2014/0274023 A1 | 9/2014 | Rajeevalochana et al. |
| 2014/0302834 A1 | 10/2014 | Jones |
| 2014/0309847 A1 * | 10/2014 | Ricci ...................... 701/33.1 |
| 2014/0309891 A1 * | 10/2014 | Ricci ...................... 701/48 |
| 2014/0323109 A1 | 10/2014 | Spangler et al. |
| 2014/0329513 A1 | 11/2014 | Jacob |
| 2014/0342717 A1 | 11/2014 | Chen et al. |
| 2014/0364153 A1 | 12/2014 | Ren |
| 2015/0021113 A1 | 1/2015 | Lefevbre et al. |
| 2015/0031330 A1 | 1/2015 | Zhou et al. |
| 2015/0031349 A1 | 1/2015 | Hill et al. |
| 2015/0050966 A1 | 2/2015 | West |

FOREIGN PATENT DOCUMENTS

| | | |
|---|---|---|
| WO | 2009105125 A1 | 8/2009 |
| WO | 2009105666 A1 | 8/2009 |

\* cited by examiner

METHOD AND APPARATUS FOR CONTROLLING INPUT TO A MOBILE COMPUTING DEVICE LOCATED INSIDE A VEHICLE

TECHNICAL FIELD

The present invention relates to a method and system used to control a mobile computing device to prevent input to the device when the device is inside a vehicle which is in motion.

BACKGROUND

Modern computing devices, such as cellular telephones, PDAs and laptop computers provide a keyboard functionality, implemented via hardware or software, for the purposes of inputting textual data by an operator. Utilizing this keyboard input functionality while operating a motor vehicle has become a significant safety hazard in recent years due to the increasing prevalence of such devices. The act of doing so poses a risk of injury or death to the operator, the passengers of the operator's vehicle, other vehicles and pedestrians due to the degree of attention required to operate keyboard input devices. Thus, it is desirable to selectively enable and disable keyboard input functionality on mobile devices in the possession of the operator of a motor vehicle while said vehicle is in motion.

Various devices have been proposed to address the texting while driving problem. Of these many deal with jamming cell phone signals which have the drawback that all cell phones in a vehicle are thus disabled. Further, such jamming does not prevent other use of the devices. Other systems relate to RF signals which require use of circuitry not normally employed in cellphones. Hence, a system and method is needed to economically provide for inhibiting texting and other uses of cellphone and other mobile computing devices while driving a vehicle.

SUMMARY

Briefly stated, provided are embodiments of a wireless transmission system and method is provided for use in a vehicle having an on-board diagnostic (OBD) system configured to provide vehicle speed data and engine operation status data. A transmission apparatus is interfaceable with the on-board diagnostic system. The transmission apparatus is configured to transmit a wireless signal as specified by Bluetooth criteria. A mobile computing device has an input device, a GPS module, and a wireless transceiver configured to receive the wireless signal in accordance with Bluetooth criteria and determine a signal level thereof. The GPS module is configured to provide GPS data as determined by received GPS signals. The mobile computing device operates in accordance with a method for determining is the mobile computing device is with a driver's seating area and disables the input device if the vehicle speed is at or above a threshold value.

The present disclosure provides a wireless transmission system for use in a vehicle having an on-board diagnostic (OBD) system configured to provide vehicle speed data and engine operation status data. The wireless transmission system includes a transmission apparatus interfaceable with the on-board diagnostic system and configured to receive the engine operation status data, the transmission apparatus being configured to transmit a wireless signal as specified by Bluetooth criteria. In some embodiments the transmission apparatus is configured to transmit a wireless signal as specified by Bluetooth Low Energy (BLE), alternatively known as "Bluetooth Smart". Compared to common Bluetooth, Bluetooth Smart is intended to provide reduced power consumption and a less complex pairing/bonding implementation, along with reduced component cost and complexity. Bluetooth Smart is not backward-compatible with the previous Bluetooth protocol, and as such should be considered a unique communication method.

Further included in the device is a mobile computing device having an input device, a GPS module, and a wireless transceiver configured to receive the wireless signal in accordance with Bluetooth criteria and determine a signal level thereof. The GPS module is configured to provide GPS data as determined by received GPS signals. The mobile computing device includes an input control configuration for effecting the following operations: (a) bonding with the transmission device; b) reading a received signal level from the wireless transceiver; (c) comparing the received signal level with an SSL threshold value; (d) determining a vehicle speed based on the GPS data; (e) comparing the vehicle speed with a vehicle speed threshold; and (f) disabling the input device when: the received signal level is at or above the SSL threshold value; and the vehicle speed is at or above the vehicle speed threshold.

In one embodiment of the present disclosure, there is provided a wireless transmission system optionally including an input control configuration which further effects repeating operations (a) through (f); and re-enabling the input device when: the received signal level is below the SSL threshold value; or the vehicle speed is below the vehicle speed threshold.

In another embodiment of the present disclosure a method for effecting disablement of an input device on mobile computing device when in a vehicle having an on-board diagnostic (OBD) system configured to provide vehicle speed data and engine operation status data is provided. The method comprises installing a transmission apparatus into a device link connector of the on-board diagnostic system wherein the transmission apparatus is configured to receive the engine operation status data, the transmission apparatus being configured to transmit a wireless signal as specified by Bluetooth criteria; and providing a mobile computing device having an input device, a GPS module, and a wireless transceiver configured to receive the wireless signal in accordance with Bluetooth criteria and determine a signal level thereof. The GPS module is configured to provide GPS data as determined by received GPS signals. The mobile computing device includes an input control configuration for effecting the following operations:

a) bonding with the transmission device;
  b) reading a received signal level from the wireless transceiver;
  c) comparing the received signal level with an SSL threshold value;
  d) determining a vehicle speed based on the GPS data;
  e) comparing the vehicle speed with a vehicle speed threshold;
  f) disabling the input device when: the received signal level is at or above the SSL threshold value; and the vehicle speed is at or above the vehicle speed threshold.

In a further embodiment of the aforesaid method the input control configuration further effects: repeating operations (a) through (f); and re-enabling the input device when: the received signal level is below the SSL threshold value; or the vehicle speed is below the vehicle speed threshold.

The above and other objects, features and advantages of the present invention will become apparent from the following description read in conjunction with the accompanying drawings, in which like reference numerals designate the same elements. The present invention is considered to include all functional combinations of the above described features and corresponding descriptions contained herein, and all combinations of further features described herein, and is not limited to the particular structural embodiments shown in the figures as examples. The scope and spirit of the present invention is considered to include modifications as may be made by those skilled in the art having the benefit of the present disclosure which substitute, for elements presented in the claims, devices or structures upon which the claim language reads or which are equivalent thereto, and which produce substantially the same results associated with those corresponding examples identified in this disclosure for purposes of the operation of this invention. Additionally, the scope and spirit of the present invention is intended to be defined by the scope of the claim language itself and equivalents thereto without incorporation of structural or functional limitations discussed in the specification which are not referred to in the claim language itself.

Additional features and advantages of various embodiments will be set forth in part in the description that follows, and in part will be apparent from the description, or may be learned by practice of various embodiments. The objectives and other advantages of various embodiments will be realized and attained by means of the elements and combinations particularly pointed out in the description and appended claims.

BRIEF DESCRIPTION OF THE DRAWINGS

In part, other aspects, features, benefits and advantages of the embodiments will be apparent with regard to the following description, appended claims and accompanying drawings where:

FIG. 3b is a flowchart of operation of a portion of the application program flowchart of FIG. 3a;

FIG. 3c is a flowchart of operation of a first embodiment of a speed determining portion of the application program flowchart of FIG. 3a;

FIG. 3d is a flowchart of operation of a second embodiment of a speed determining portion of the application program flowchart of FIG. 3a;

FIG. 3e is a flowchart of operation of a third embodiment of a speed determining portion of the application program flowchart of FIG. 3a;

FIG. 3f is a flowchart of operation of a fourth embodiment of a speed determining portion of the application program flowchart of FIG. 3a;

It is to be understood that the figures are not drawn to scale. Further, the relation between objects in a figure may not be to scale, and may in fact have a reverse relationship as to size. The figures are intended to bring understanding and clarity to the structure of each object shown, and thus, some features may be exaggerated in order to illustrate a specific feature of a structure.

DETAILED DESCRIPTION

For the purposes of this specification and appended claims, unless otherwise indicated, all numbers expressing quantities of ingredients, percentages or proportions of materials, reaction conditions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "1 to 10" includes any and all subranges between (and including) the minimum value of 1 and the maximum value of 10, that is, any and all subranges having a minimum value of equal to or greater than 1 and a maximum value of equal to or less than 10, e.g., 5.5 to 10.

It is noted that, as used in this specification and the appended claims, the singular forms "a," "an," and "the," include plural referents unless expressly and unequivocally limited to one referent. Thus, for example, reference to "a drug depot" includes one, two, three or more drug depots.

It is to be further understood that all disclosure of immediate connections between elements of the present disclosure are intended to positively disclose direct connections without intervening elements, but are not intended to exclude incorporation of intervening elements unless specifically related in claim language. Similarly, it is to be understood that with regard to methods and flowcharts herein, a disclosure of operations directly following one another, or a disclosure of steps wherein a first step directly follows a second step, is intended to positively disclose direct sequential following without intervening operations, but is not intended to exclude intervening operations unless explicitly related in claim language.

It is also to be further understood that the doctrine of claim differentiation is to be applied between independent claims and their dependents and is not intended to be applied across independent claims. For example, term A in a first independent claims may be interpreted to have the same scope as term B in a second independent claim, while if term A is in a first independent claim and term B further defines term A in claim dependent from the first independent claim, then term A must have a broader scope than term B. In other words, phrases that differ from one independent claim to another independent claim may be interpreted to have equal scope and read on common structure yet present the structure using different terminology in order to account for differing interpretation of phrase language.

Reference will now be made in detail to various embodiments of the present disclosure, examples of which are illustrated in the accompanying drawings. While the embodiments of the present disclosure will be described in conjunction with the illustrated embodiments, it will be understood that they are not intended to limit the invention to those embodiments. On the contrary, the invention is intended to cover all alternatives, modifications, and equivalents, which may be included within the invention as defined by the appended claims.

The headings below are not meant to limit the disclosure in any way; embodiments under any one heading may be used in conjunction with embodiments under any other heading.

The foregoing summary broadly details some embodiments of the present disclosure. In another embodiment of the present disclosure the wireless transmission system optionally provides the transmission apparatus configured to transmit OBD system speed data. Furthermore the input control configuration effects using the OBD system speed data as the vehicle speed if the GPS data is not available.

In a further embodiment of the present disclosure the wireless transmission system optionally includes the transmission apparatus determining from the OBD system whether an engine of the vehicle is running and transmits the wireless signal in response to determining that the engine is running.

In a still further embodiment of the present disclosure the wireless transmission system includes the input control configuration being effected by software loaded into a memory of the mobile computing device.

In a yet further embodiment of the present disclosure the wireless transmission system optionally has the input control configuration effected by firmware loaded into a memory of the mobile computing device.

In a still further aspect of the present disclosure the input device is optionally a keyboard device.

In yet a further embodiment of the present disclosure the wireless transmission system optionally includes the transmission apparatus and the transceiver of the mobile computing device effecting automatic bonding.

In another embodiment of the present disclosure the wireless transmission system optionally provides the transmission apparatus configured to transmit OBD system speed data. Furthermore the input control configuration effects using the OBD system speed data as the vehicle speed if the GPS data is not available.

In a further embodiment of the present disclosure the wireless transmission system optionally includes the transmission apparatus determining from the OBD system whether an engine of the vehicle is running and transmits the wireless signal in response to determining that the engine is running.

In an embodiment of the present disclosure the wireless transmission system includes the input control configuration being effected by software loaded into a memory of the mobile computing device.

In a yet further embodiment of the present disclosure the wireless transmission system optionally has the input control configuration effected by firmware loaded into a memory of the mobile computing device.

In a still further aspect of the present disclosure the input device is optionally a keyboard device.

In yet a further embodiment of the present disclosure the wireless transmission system optionally includes the transmission apparatus and the transceiver of the mobile computing device effecting automatic bonding.

Mobile Computing Device (MCD), as used herein and throughout this disclosure, refers to any electronic device equipped with at least one of the following: a processor, memory, display, operating system, input function. Examples of such devices are portable "laptop" computers, tablets, personal digital assistants (PDA), "smart" mobile telephones (smartphones), or other types of devices which may yet be developed which provide at least some of the functions of the aforesaid exemplary devices.

Input Function, as used herein and throughout this disclosure, refers to any hardware or software arrangement of input buttons whose primary function is to trigger data input to a mobile computing device when manipulated by a human, either by direct tactile interaction or via the use of a pen, stylus or other implement. Typically the input function is the keyboard on a smartphone which may include a physical keyboard or a simulated keyboard on a touch-screen.

Apparatus, as used herein and throughout this disclosure, refers to any device to interface the OBD system to gather speed data and to interface to a wireless transmitter for transmission of speed data to one or more mobile computing devices.

Application Program, as used herein and throughout this disclosure, refers to a software or firmware program that operates within the mobile computing device which retrieves speed data, retrieves measured signal strength, uses method to determine owner of mobile computing device, and disables input function of mobile computing device if the mobile computing device is held by or located near to the driver of the motor vehicle Signal Strength Level Threshold, as used herein and throughout this disclosure, refers to a pre-determined number or set of numbers that is used to compare against a measured signal strength for determining the location a mobile computing device. The signal strength level threshold is determined by measurements recorded within a motor vehicle, calculated using simulation tools that model the inside of a motor vehicle or some combination of the two.

Speed Threshold, as used herein and throughout this disclosure, refers to a pre-determined number that is used to compare against a motor vehicle speed to determine if operation of a mobile computing device is safe to use.

Bluetooth® Low Energy (BLE), Bluetooth® LE, Bluetooth® Smart, as used herein and throughout this disclosure, refers to a specific wireless personal area network technology designed and marketed by the Bluetooth Special Interest Group. It differs in nature and application from conventional Bluetooth® implementations. Bluetooth® Low Energy (BLE), Bluetooth® LE and Bluetooth® Smart are used interchangeably.

Motor Vehicle, as used herein and throughout this disclosure, includes a car, truck, bus, motorcycle or other motorized vehicle, and may be equipped with an On-Board Diagnostic port (OBD).

Operator Control Area, as used herein and throughout this disclosure, is the physical area where the driver is positioned during operation of the motor vehicle and includes a driver's seat, steering wheel, center console, instrument cluster, ashtray and sun visor.

Figure 1:
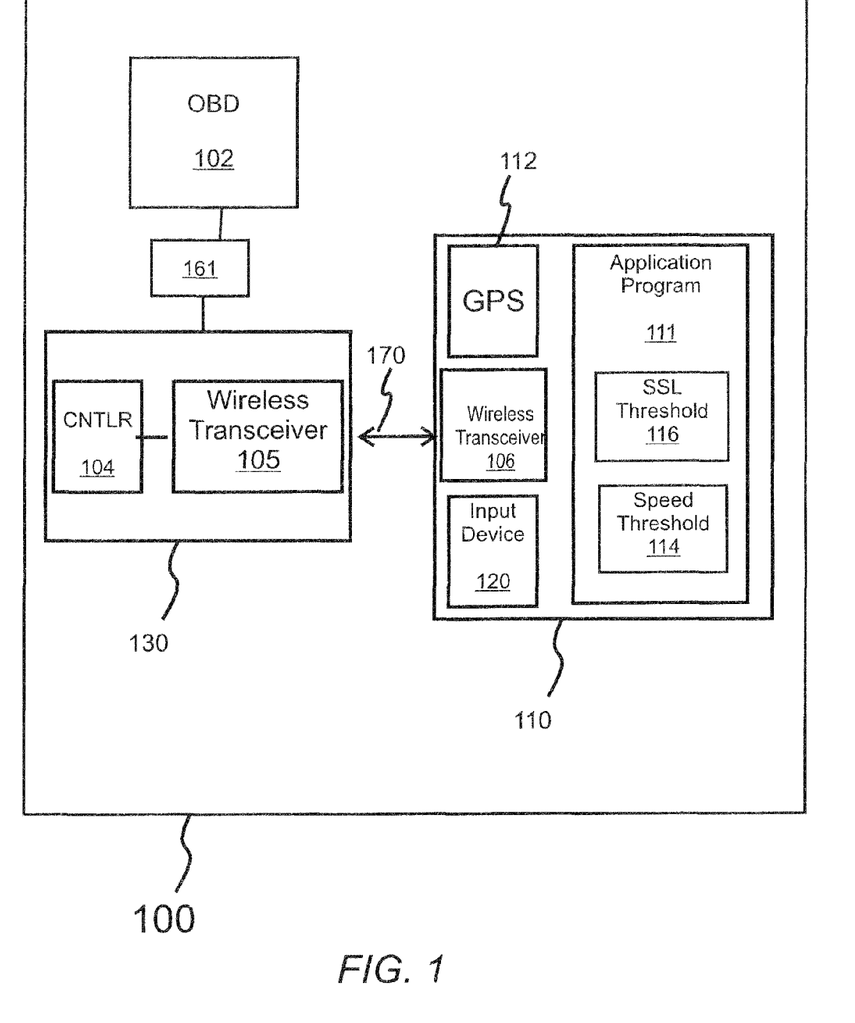
FIG. 1 is a block diagram of a system of the present disclosure.

Referring to FIG. 1, a vehicle 100 has an On-Board diagnostics system (OBD) 102 installed therein which monitors various sensors in the vehicle including a sensor for the engine running state and a sensor reporting a speed of the vehicle 100. The OBD 102 provides a Diagnostic Link Connector (DLC) 161 which is a 16 pin connector for interfacing with test instrumentation. The OBD 102 was initially developed to provide diagnostics for maintenance of the vehicle 100, in particular, the emissions control devices of the vehicle 100. Various government regulations are presently implemented to require that vehicles have an OBD 102 which conforms to the OBD-II standard which requires various emission parameters to be communicated but which also allow many optional parameters to also be communicated. Automobile manufactures now use this system to communicate information regarding many aspects of vehicle operation, including the speed of the vehicle and whether the engine is running. For the purpose of the present disclosure, it is not required that the OBD 102 conform to any specific standard except that the OBD provide functioning in accordance with the specific functions related in this disclosure for practice of embodiments of the system and method described herein.

The system of the present disclosure includes a transmission apparatus 130 which optionally includes a controller 104 and a wireless transceiver 105. The transmission apparatus 130 is designed to emit a wireless link signal 170 that will be measured by a mobile computing device (MCD) 110. The controller 104 can be of any type having memory and the functionality to effect operations detailed herein. Optionally, the controller 104 is a small low-power microcontroller such as, for example and not intended as a limitation, an Atmel tinyAVR series, Atmel SAM3U series or similar, which are optionally configured to interface with the wireless transceiver 105 to produce the wireless link signal 170 that can be measured by the MCD 110. Wireless transceivers may be of any type compatible with the MCD 110 including technologies based on Bluetooth®, Bluetooth® Smart, or a WiFi, type transmission for example and not limitation. For example, wireless transceiver 105 may be designed using Nordic nRF51422 Bluetooth® Smart transceiver. Alternatively, the controller 104 and the wireless transceiver 105 are combined into a single integrated unit. For example, many wireless transceivers include an embedded microcontroller as part of the integrated circuit package such as Texas Instrument CC2640. It is to be understood for the purpose of this disclosure that functions the controller 104 and the wireless transceiver 105 may be integrated together or distributed amongst various types of electronic components. For example, while microcontrollers provide both a CPU and memory for storing programming directed to a specific computing application to provide a cost effective solution, similar functionality may be obtained by providing independent CPU and memory components.

The system and method of the present disclosure further includes the mobile computing device (MCD) 110 configured to provide the functionality described herein. The MCD 110 includes a wireless transceiver 106 of a similar type to wireless transceiver 105 that allows the wireless link signal 170 to be established between the transmission apparatus 130 and the MCD 110. The wireless link signal 170 may be designed as a broadcast link where communications occur from the transmission apparatus 130 to the MCD 110. The wireless link signal 170 may be designed as a two-way link where communications occurs from the transmission apparatus 130 to the MCD 110 and from the MCD 110 to the transmission apparatus 130. In an embodiment of the present disclosure, the transceiver 105 of the transmission apparatus 130 and the transceiver 106 of the MCD 110 are Bluetooth® Smart compliant transceivers configured to automatically pair when the two transceivers are in close proximity. Alternatively, other Bluetooth® compliant systems may be used, or future developed wireless data transmission systems may be optionally used within the scope and spirit of the present disclosure.

The MCD 110 includes memory and an application program 111, often referred to as an "app" in present day parlance, designed to receive the signal level measured at the transceiver 106 that was transmitted from the transceiver 105. The application program 111 may be installed on the MCD 110 by the user or the application program may be incorporated in the MCD 110 at the time of manufacture in the form of software. Still further, the application program 111 is optionally incorporated into the MCD 110 in the form of firmware designed into the MCD 110 when manufactured. The use of firmware prevents a user from removing the application program from the MCD 110. It is further contemplated that the application software optionally includes anti-removal code to prevent removal of the software after installation. Such anti-removal code may either prevent removal outright, or it may invoke a permanently, or semi-permanently disabling feature on the MCD 110, such as a disabling input device, display, or other features. In such an implementation, the disabling feature may be configured to permit emergency transmissions only such as 911 calls.

The system of the present disclosure addresses the situation wherein both the transmission apparatus 130 and the MCD 110 are located within the motor vehicle 100. The MCD 110 also includes a Global Positioning System (GPS) module 112. The GPS module 112 is capable of reporting the speed at which the MCD is moving, and hence a vehicle speed, to the application program 111. Various GPS techniques may be employed to determine the speed as known to those skilled in the art and are thus not elaborated upon herein. Additionally, the speed maybe determined by the application program 111 by taking position readings from the GPS module 112 rather than reading a vehicle speed from the GPS module 112.

The application program 111 optionally contains at least two threshold variables, namely a speed threshold 114 and signal a signal strength level (SSL) threshold 116. The SSL threshold 116 is used to determine a physical location of the MCD 110 within the motor vehicle 100. The speed threshold 114 is used to decide when the speed of the motor vehicle 100 is too fast for safe operation of the input function 20 of the MCD 110. The input function 20 is any of a physical keyboard, a touchscreen keyboard. The input function 20 is optionally any type of input mechanism as may be developed that requires human attention to operate such as a voice command system or a gesturing system. While presently texting by the user when the user is operating a moving motor vehicle is of great concern, it is also envisioned that other types of input, whether for sending communications such as text messages or operating the MCD 110 for other purposes, may be discovered to be problematic when operating the motor vehicle.

In an embodiment of the present disclosure, the MCD 110 does not require any hardware modification from the original configuration designed by the manufacturer to implement the system and method of the present disclosure. Most MCDs include a function to disable the keyboard to prevent unintended operation of the device by the user such as when the MCD is in a pocket, purse or briefcase, or to prevent unauthorized use of the MCD. This function is usually built into the operating system of the MCD 110 and is accessible by programs running on the MCD 110. Hence, the application program 111 utilizes the disablement function of the operating system but is not so limited to do so as other programming techniques may be employed to implement the disablement feature of the present disclosure as may be ascertained by those skilled in the art having the benefit of the present disclosure. As noted above, while the application program 111 may be loaded by the user, it may also be pre-installed by the manufacturer. The application program 111 may also be built-into the MCD 110 in the form of firmware, or hardwired logic circuitry.

Figure 2:
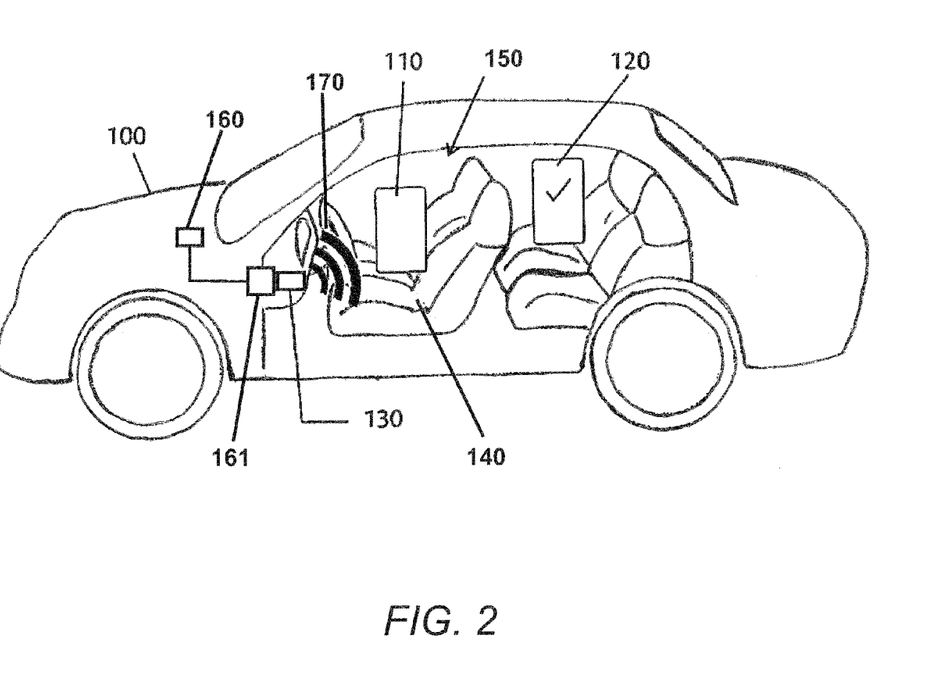
FIG. 2 is an illustration of an installation of the system of the present disclosure.

Referring to FIG. 2, a configuration for determining a position of the MCD 110 within the motor vehicle 100 with respect to its proximity to an operator control area 140 is shown. The transmission apparatus 130 is shown to be located within passenger compartment 150 of the motor vehicle 100. In an embodiment, the transmission apparatus 130 is optionally located in a nearest proximity to an operator control area 140 by virtue of being installed directly into the device link connector 161 resulting in the highest measured signal level from the transmission apparatus 130 at the MCD 110 when the MCD is positioned in operator control area 140. In accordance with 40 CFR 86.094-17(h)(4), the DLC 161 is to be positioned as follows:

> The vehicle connector shall be located in the passenger compartment in the area bounded by the driver's end of the instrument panel to 300 mm beyond the vehicle centerline, attached to the instrument panel, and accessible from the driver's seat. The preferred location is between the steering column and the vehicle centerline. The vehicle connector shall be mounted to facilitate mating and unmating.

The transmission apparatus 130 communicates with the MCD 110 over a wireless link signal 170. If the measured signal strength received from the transmission apparatus 130 exceeds the SSL threshold 116, the MCD 110 is determined to be operated by the driver of the motor vehicle 100 and the application program 111 disables the input device 120 on the MCD 110 when the motor vehicle 100 is in motion. If the measured signal strength is below the SSL threshold 116, the MCD 110 is determined to be operated by a passenger, such as the case shown in FIG. 2, having the MCD 120 located in the rear of the passenger compartment 150. In this case, the input device 120 for the MCD 130 will not be disabled regardless of whether the motor vehicle 100 is in motion or not.

In an embodiment, the SSL threshold 116 is optionally a single value to which to the measured signal strength at the MCD 110 is compared after being transmitted from the transmission apparatus 130. Table 1 shows the values for a measured signal strength averaged across three types of motor vehicles, namely a sports car, small sedan and SUV. The values reported on Table 1 are a function of the distance between the transmission apparatus 130 and an instrument simulating the measurement from the MCD 110. For the measurements in Table 1, the transmission apparatus 130 was located in operator control area 140 in accordance with the OBDII standard. Based on the measurements in Table 1, a SSL threshold 116 of −35 dBm to −40 dBm provides the necessary information for determining when the MCD 110 is located in operator control area 140. While the aforesaid values are absolute values, it will be understood by those skilled in the art of wireless system design, that a measured signal value will necessarily depend upon the initial transmission level. Hence, the values provided herein are exemplary in nature and may be varied based upon the transmission characteristics of the transmission apparatus 130 and the receiving characteristics of the MCD 110. A measured value at or above the SSL threshold 116 would indicate the MCD 110 is within the operator control area 140 and a measured value below the SSL threshold 116 would indicate the MCD 110 is outside operator control area 140. When the MCD 110 is determined to be within operator control area 140, the application program 111 disables the input device 120 to the MCD 110 when the motor vehicle 100 is in motion or determined that the speed of the motor vehicle 100 is traveling at a rate above the speed threshold 114.

TABLE 1

| Range (inches) | Signal (dBm) | Location |
|---|---|---|
| 6 | −10 | Driver Seat |
| 12 | −15 | Driver Seat |
| 24 | −25 | Center console |
| 36 | −52 | Pass. Seat |
| 48 | −70 | Pass. Seat |
| 60 | −80 | Rear Seat |
| 72 | −91 | Rear Seat (SUV) |

The values reported in Table 1 are related to the Radio Signal Strength Indicator (RSSI) that is reported by a variety of commercially available transceivers. For example, the Nordic nRF51422 is a Bluetooth® Smart transceiver which reports RSSI in values of negative dBm with a 1 dB resolution.

Figure 3A:
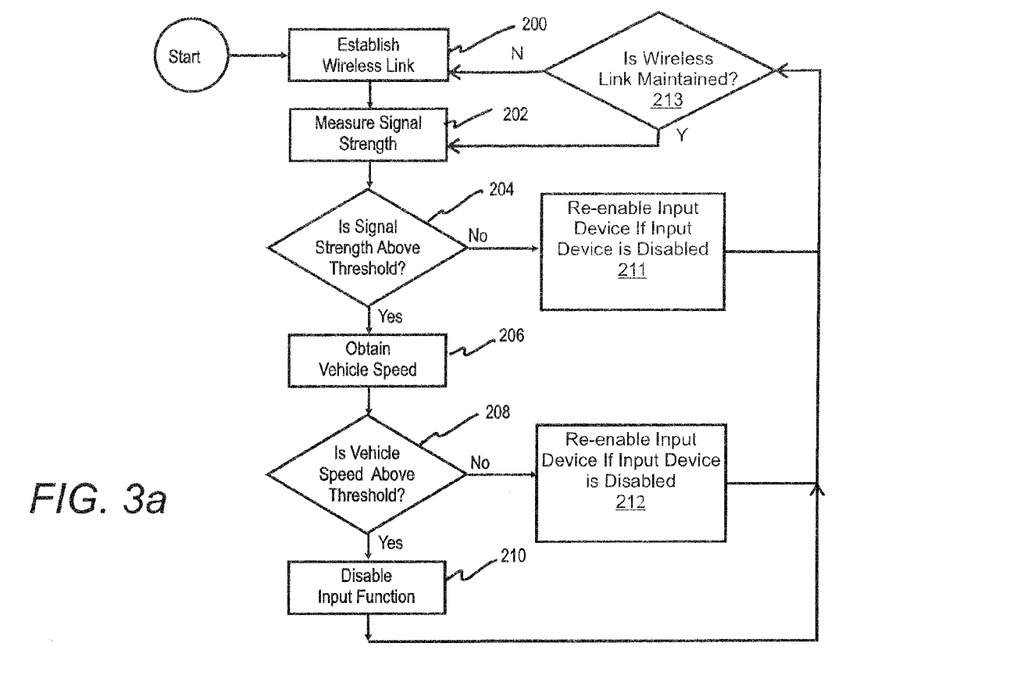
FIG. 3a is a flowchart of operation of an application program of the present disclosure which is installed in a mobile computing device.

Referring to FIG. 3a, an embodiment of a method of determining whether the input device 120 of the MCD 110 should be disabled when located in operator control area 140 is illustrated in a flowchart for operation of the application program 111 in the MCD 110. The method starts with the transmission apparatus 130 executing a wireless link operation 200 to establish a link, or bond, with the transmission apparatus 130. In an embodiment, the wireless link operation 200 provides an automatic connection from the transmission apparatus 130 via a Bluetooth® Smart implementation to the MCD 110. The wireless link operation 200 need not be a Bluetooth Smart connection and can be any connection where the transmission apparatus 130 is transmitting a wireless signal that can be measured at the MCD 110.

Once the link is established, the MCD 110 executes a signal strength measuring operation 202 which measures the received signal strength of the link established. A signal determination operation 204 is next executed to whether or not the signal strength is above a pre-determined SSL threshold 116 set to coincide with the MCD 110 being located in operator control area 140. If the measured signal strength is below the SSL threshold 116, the method proceeds to a re-enablement operation 211 which determines if the input device 120 is presently disabled and re-enables the input device 120 if it has been disabled. The method is a repetitive operation, and it is possible that the received signal strength was previously in the range requiring disablement and was thus disabled. Such a situation may occur if a driver exchanges seats with a passenger. While a determination can be made, it is optional, and the operation may simply always set an enablement state.

If the determination in operation 204 is that the measured signal strength is above SSL threshold 116, it is presumed that the user is in the driver's area 110 and the MCD 110 next executes a speed obtainment operation 206 wherein the motor vehicle speed is obtained from one of the OBD 102 or the GPS 112 of the MCD 110. Various embodiments of this operation are detailed below and in FIGS. 3c-3f.

The method next proceeds to a determination operation 208 wherein it is determined whether or not the motor vehicle 100 is traveling at or above pre-determined the speed threshold 114. If the motor vehicle speed is below the speed threshold 114, the method proceeds to a re-enablement operation 212 which is the same as re-enablement operation 211. This addresses the situation wherein the vehicle speed was previously in the range requiring disablement and the input device 120 was thus disabled. Such a situation may occur if a driver was previously driving and has now pulled over and stopped the vehicle 100 or reduced the vehicle speed to a level below the speed threshold 114. While a determination can be made as to whether disablement is in effect, it is optional, and the operation may simply always set an enablement state.

If the determination operation 208 yields a positive result, a disable input device operation 210 is executed wherein the application program 111 sends a disablement command for the input device 120 via the operating system of the MCD 110 to prevent operation of the input device 120. Thus, the method determines that the user is in the driver's compartment 110 and that the vehicle speed is at or above the SSL threshold 116 to prevent operation of the input device 120.

The operations 211, 212, and 210 all are followed by a link verifying operation 213 to address a situation wherein a previously established link has been lost. If the result is negative, the establish link operation is 200 is then executed to attempt to again establish a link. If the result is positive, the signal strength measuring operation 202 is again executed and the method repeats to continuously monitor whether the MCD 110 is in the driver's area 110 and whether the vehicle speed requires disablement. Any additional MCD that is brought into range of the transmission apparatus 130 is also optionally configured to execute this method.

Figure 3B:
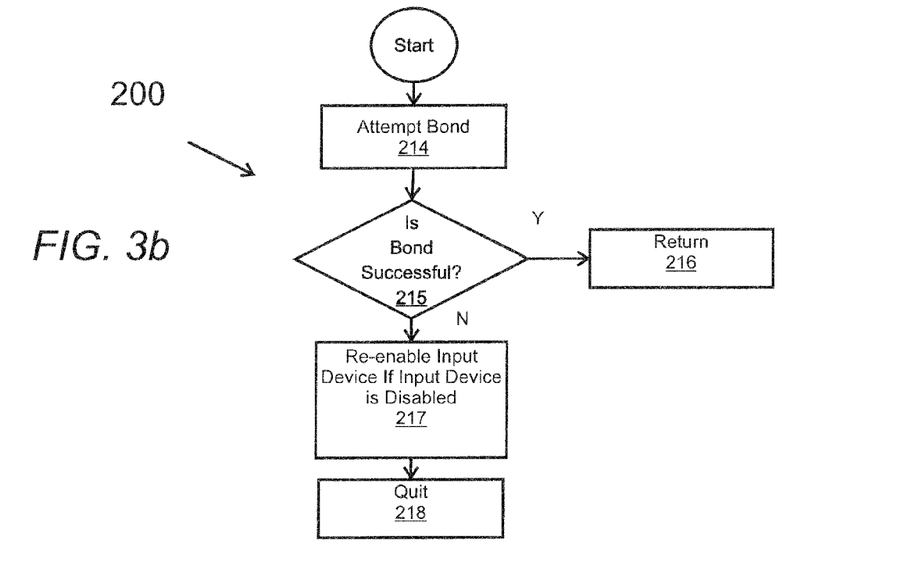

FIG. 3b is a flowchart of the link establishing operation 200 of FIG. 3a. The procedure begins with a bond execution operation 214. This operation provides hand shaking signals to establish a bond with the transmission apparatus 130 and may make multiple attempts in an effort to establish the bond, or link. After execution, flow proceeds to a bond determination operation 215 wherein it is determined whether a bond has been made. If the determination is positive, flow proceeds to return 216 which continues flow in the flowchart of FIG. 3a. If the determination is negative, flow proceed to a re-enablement operation 217 which operates to explain the prior re-enablement operations 211 and 212. In this instance, since a bond could not be established it is possible that the transmission apparatus 130 is not operating. This may be due an electrical system failure in the vehicle 100 in which case it is likely the vehicle is not operating. Following the re-enablement operation 217, a quit operation 218 is executed and the program ceases.

Figure 3C:
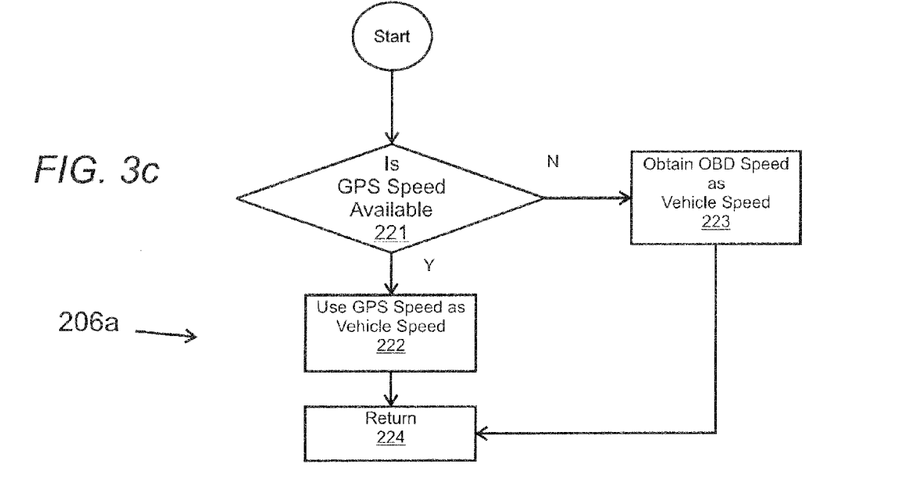

FIGS. 3c-3f are flowcharts of various embodiments to obtain vehicle speed operation 206 wherein determinations are made as to whether to use the GPS speed provided by the GPS module 112 of the MCD 110 or the speed provided by the OBD 102. In FIG. 3c, a first embodiment of the vehicle speed operation 206 is shown and designated 206a. A determination operation 221 determines if a GPS speed can be obtained. If the determination is negative, such as in the event that the MCD 110 is shielded from GPS reception or the GPS is otherwise disabled, flow proceeds to an OBD speed operation 223 which obtains the OBD speed transmitted by the transmission apparatus 130 and assigns the value to the vehicle speed to be used in the method. If the determination is positive, an obtain GPS speed operation 221a is executed followed by an obtain OBD speed operation 223a. The OBD speed is sent by the transmission apparatus 130 as detailed below with reference to a flowchart of operation of the transmission apparatus 130. In an averaging operation 225, an average of the GPS speed and the OBD speed is calculated and is assigned to the vehicle speed. As will be made evident below, such averaging is not a requirement of the present disclosure but an optional feature which may enhance accuracy of the determination of vehicle speed. In either scenario flow proceeds to return operation 230 from which the flow of the procedure in FIG. 3a continues.

Figure 3D:
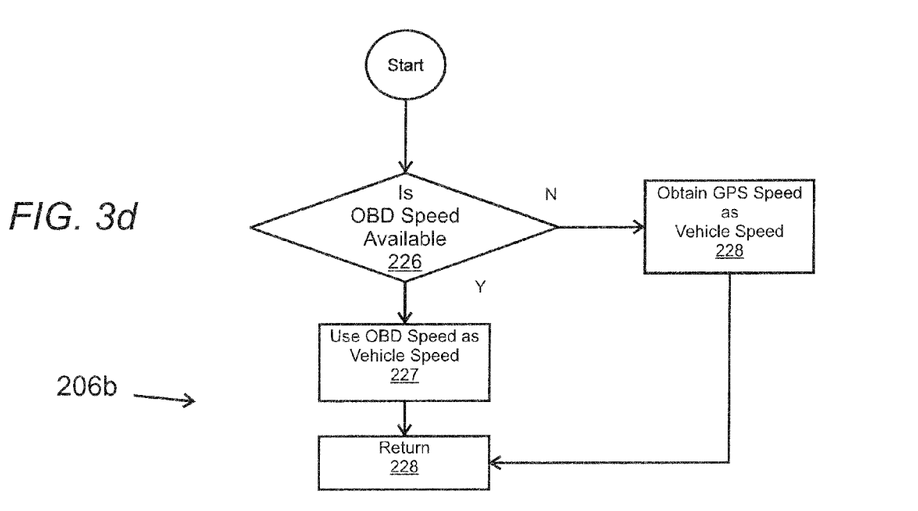

In FIG. 3d, a second embodiment of the vehicle speed operation 206 is shown and designated 206b. A determination operation 221 determines if a GPS speed can be obtained. If the determination is negative, flow proceeds to an OBD speed operation 223 which obtains the OBD speed transmitted by the transmission apparatus 130 and assigns the value to the vehicle speed to be used in the method. If the determination is positive, a GPS speed operation 222 is executed and the GPS speed is assigned to the vehicle speed. In either scenario flow proceeds to return operation 230 from which the flow of the procedure in FIG. 3a continues.

Figure 3E:
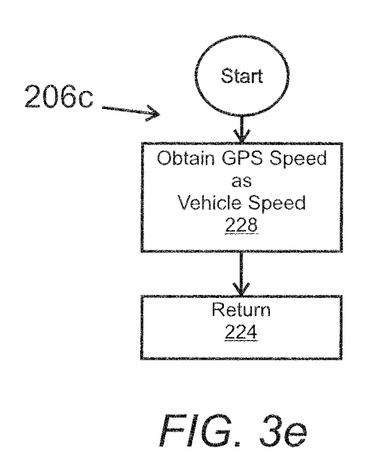

A third embodiment of the vehicle speed operation 206 is shown in FIG. 3e and designated 206c. A determination operation 226 determines if an OBD speed can be obtained. If the determination is negative, flow proceeds to a GPS speed operation 228 which obtains the GPS speed provided by the GPS module 112 and assigns the value to the vehicle speed to be used in the method. If the determination is positive, an OBD speed operation 227 is executed and the OBD speed is assigned to the vehicle speed. In either scenario flow proceeds to return operation 230 from which the flow of the procedure in FIG. 3a continues.

In the above speed determining operations, when the MCD 110 is not able to retrieve the motor vehicle speed due to loss of a GPS signal reception, unavailable GPS speed data, a faulty or missing GPS module 112 the motor vehicle speed data is be obtained through the motor vehicle's On-Board Diagnostic (OBD) subsystem. The OBD subsystem 160 includes a set of Electronic Control Units processing sensor data throughout the motor vehicle 100. FIG. 2 also illustrates a configuration with the transmission apparatus 130 connected to OBD's Diagnostic Link Connector (DLC) 161. DLC 161 is typically located under the dashboard and connected to Electronic Control Unit (ECU) 160. ECU 160 processes information from various sensors and other ECUs contained within the motor vehicle 100 and broadcasts this information as a series of OBD Codes to DLC 161. SAE J1962 specifies the location of the DLC 161 as discussed above. The transmission apparatus 130, connected directly to DLC 161, will be located in the nearest proximity to operator control area 140 resulting in a high signal level from the transmission apparatus 130 measured at the MCD 110. The transmission apparatus 130 communicates with the MCD 110 over the wireless link signal 170. In the above embodiments, the wireless link signal 170 broadcasts the vehicle speed of the motor vehicle 100. In an embodiment, the wireless link signal 170 will utilize Bluetooth® Smart-compliant transceivers.

Figure 3F:
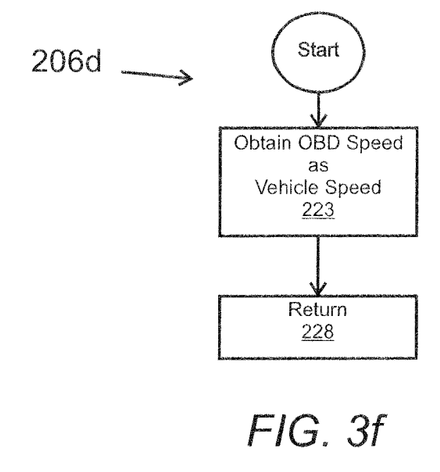

In FIG. 3f, a fourth embodiment of the vehicle speed operation 206 is shown and designated 206d. A GPS speed is obtained in the operation 228. Flow proceeds to return operation 230 from which the flow of the procedure in FIG. 3a continues. This embodiment relies only on the GPS speed provided by the GPS module 112 and is suitable for GPS enabled MCD's.

In another embodiment of the vehicle speed operation, the OBD speed operation is executed and the OBD speed is assigned to the vehicle speed and flow proceeds to return operation from which the flow of the procedure in FIG. 3a continues. This embodiment does not rely on a GPS module 112 for speed measurement.

Figure 4:
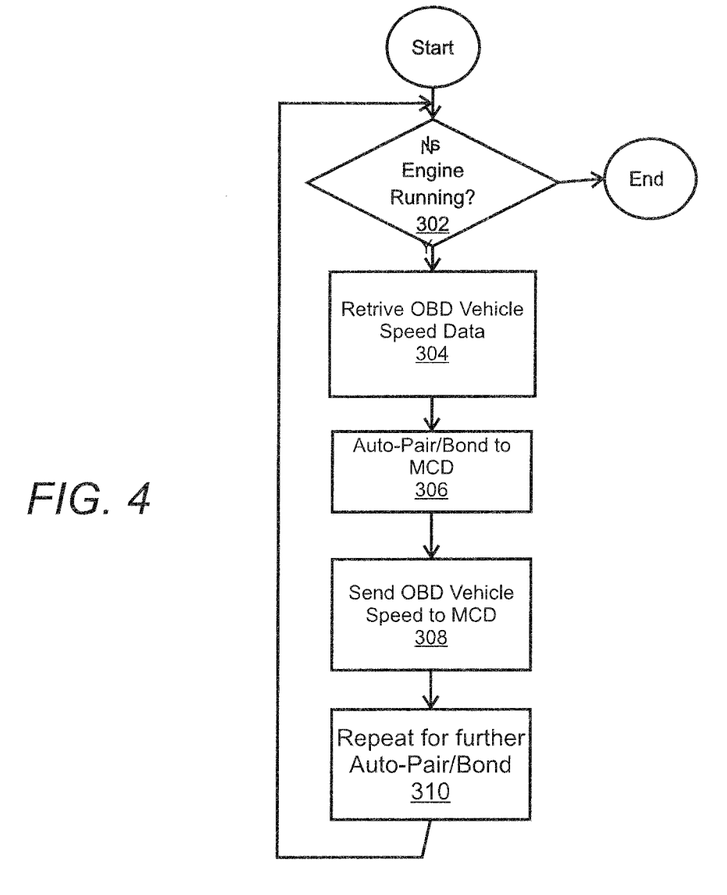
FIG. 4 is a flowchart of operation of a transmission apparatus of the present disclosure.

Referring to FIG. 4, a flowchart of an embodiment of a method of operation of the transmission apparatus 130 is shown. The operation starts with the power up of the transmission device. An engine running operation 302 queries the OBD system 160 to determine if the engine is running. If the determination is negative the operation then ends. If positive, an OBD speed retrieval operation 304 is executed and the vehicle speed is transmitted from the OBD 160. Next a bonding operation 306 is executed wherein the controller 104 operates the transceiver 105 to effect bonding with the MCD 110 and other MCD's in the reception range. Once the bonding has been achieved, a speed transmission operation 308 is executed wherein the OBD speed of the vehicle 100 is transmitted to the MCD 110 and other receiving MCD's. Following transmission, a repeat operation is executed wherein flow is directed back to the engine running operation 302 so that further bonding and transmission of speeds may occur. As an alternative, it may be assumed that the engine is running and operation 302 omitted. In this case, bonding and speed transmission is continuously effected.

Figure 5:
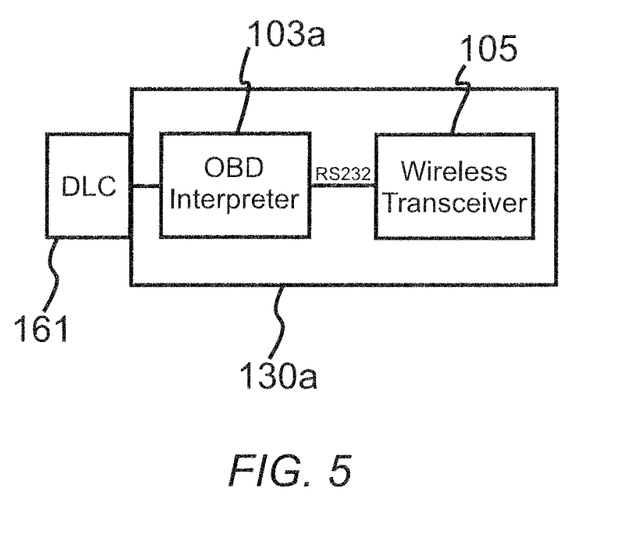
FIG. 5 is a block diagram of another embodiment of a transmission apparatus of the present disclosure.

Referring to FIG. 5, an embodiment of the transmission apparatus 130 is shown in the form of transmission apparatus 130a. The controller 103 is embodied as an OBD-to-RS232 interpreter 103a connecting to DLC 161. The interpreter 103a is an integrated chip such as ELM Electronics ELM327 or similar. The ELM327 supports OBDII protocols including SAE J1850 PWM, SAE J1850 VPW, ISO 9141-2, ISO 14230-4 (KWP), and ISO 15765-4 (CAN). The output from the interpreter 103a interfaces with the wireless transceiver 105 which includes an embedded processor such as Nordic nRF51822 multiprotocol single chip radio transceiver with SRM Cortex CPU. The Nordic nRF51822 includes a UART digital interface for connection to the ELM327 RS232 output interface.

It should be noted that vehicle speed data obtained through the OBD subsystem may be contained in a Parameter ID (PID). The PID may require translation to extract a numeric value of the vehicle speed. The PID may be translated by controller 104 of the transmission apparatus 130 or PID may be transmitted to the MCD 110 and translated by the application program 111.

In various embodiments, both the vehicle speed from GPS 12 and vehicle speed from the OBD subsystem may be available to the application program 111 which may select one vehicle speed of the two to compare to the speed threshold 114. As a further optional enhancement, the application program 111 may combine the two values for vehicle speed to achieve a more robust value of the motor vehicle speed.

In another embodiment of the system and method of the present disclosure, the application program 111 may operate using only GPS speed data obtained via the GPS module 112. In this embodiment, as will be realized by those skilled in the art, the transmission apparatus 130 need not transmit vehicle speed data hence the OBD speed retrieval operation 304 and the OBD speed transmission operation 308 may be omitted and the transmission apparatus need only effect the bonding operation 306 whereby the application program 111 may determine a received signal strength. It will be further realized in light of this disclosure that a wireless communication may be effected that does not require pairing, or bonding, as in the aforesaid embodiment the application program 111 need only determine a signal strength without need for actually exchanging data, in which case the wireless transceiver may be replaced with a wireless receiver.

The wireless link signal 170 may broadcast other vehicle operating parameters available using existing and future OBD PID codes to indicate when the motor vehicle 100 is in operation and in motion. These include codes for fuel consumption, fuel pressure, intake and exhaust control settings, throttle/pedal position, cruise control, clutch position and ignition/distributor engine speed to name a few. Any of these codes could be used when determining if it is safe to enable the input device 120 of the MCD 110.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, as one skilled in the art can readily appreciate that the sequences may be varied and still remain within the spirit and scope of the present invention limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, as one skilled in the art can readily appreciate that the sequences may be varied and still remain within the spirit and scope of the present invention.

It will be apparent to those skilled in the art that various modifications and variations can be made to various embodiments described herein without departing from the spirit or scope of the teachings herein. Thus, it is intended that various embodiments cover other modifications and variations of various embodiments within the scope of the present teachings.

What is claimed is:

1. A wireless transmission system for use in a vehicle having an on-board diagnostic (OBD) system configured to provide vehicle speed data and engine operation status data, the wireless transmission system comprising:
   a transmission apparatus interfaceable with said on-board diagnostic system and configured to receive said engine operation status data, said transmission apparatus being configured to transmit a wireless signal as specified by Bluetooth criteria, said transmission apparatus transmits OBD system speed data;
   a mobile computing device having an input device, a GPS module, and a wireless transceiver configured to receive said wireless signal in accordance with Bluetooth criteria and determine a signal level thereof;
   said GPS module being configured to provide GPS data as determined by received GPS signals;
   said mobile computing device including an input control configuration for effecting the following operations:
   a) bonding with the transmission device;
   b) reading a received signal level from said wireless transceiver;
   c) comparing said received signal level with an SSL threshold value;
   d) determining a vehicle speed based on said GPS data;
   e) comparing said vehicle speed with a vehicle speed threshold; and f) disabling said input device when:
  said received signal level is at or above said SSL threshold value;
  and said vehicle speed is at or above said vehicle speed threshold;
wherein said transmission apparatus transmits OBD system speed data; and
said input control configuration effects using said OBD system speed data as said vehicle speed if said GPS data is not available;
  wherein said transmission apparatus determines from said OBD system whether an engine of the vehicle is running and transmits said wireless signal in response to determining that the engine is running;
  wherein said input control configuration further effects:
  repeating operations (a) through (f); and
  re-enabling said input device when:
said received signal level is below said SSL threshold value; or said vehicle speed is below said vehicle speed threshold.

2. A wireless transmission system of claim 1 wherein said input control configuration is effected by software loaded into a memory of said mobile computing device.

3. A wireless transmission system of claim 1 wherein said input control configuration is effected by firmware loaded into a memory of said mobile computing device.

4. A wireless transmission system of claim 1 wherein said input device is a keyboard device.

5. A wireless transmission system of claim 1 wherein said transmission apparatus and said transceiver of said mobile computing device effect automatic bonding.

6. A wireless transmission system of claim 1 wherein said input control configuration is effected by software loaded into a memory of said mobile computing device.

7. A wireless transmission system of claim 1 wherein said input control configuration is effected by firmware loaded into a memory of said mobile computing device.

8. A method for effecting disablement of an input device on mobile computing device when in a vehicle having an on-board diagnostic (OBD) system configured to provide vehicle speed data and engine operation status data, the method comprising:
  installing a transmission apparatus into a device link connector of said on-board diagnostic system wherein said transmission apparatus is configured to receive said engine operation status data, said transmission apparatus being configured to transmit a wireless signal as specified by Bluetooth criteria; and
  providing a mobile computing device having an input device, a GPS module, and a wireless transceiver configured to receive said wireless signal in accordance with Bluetooth criteria and determine a signal level thereof;

wherein:
  said GPS module is configured to provide GPS data as determined by received GPS signals;
  said mobile computing device includes an input control configuration for effecting the following operations:
    a) bonding with the transmission device;
    b) reading a received signal level from said wireless transceiver;
    c) comparing said received signal level with an SSL threshold value;
    d) determining a vehicle speed based on said GPS data;
    e) comparing said vehicle speed with a vehicle speed threshold;
    f) disabling said input device when:
      said received signal level is at or above said SSL threshold value; and
      said vehicle speed is at or above said vehicle speed threshold;
wherein said input control configuration further effects:
  repeating operations (a) through (f); and
  re-enabling said input device when:
said received signal level is below said SSL threshold value; or
  said vehicle speed is below said vehicle speed threshold;
wherein said transmission apparatus transmits OBD system speed data; and
  said input control configuration effects using said OBD system speed data as said vehicle speed if said GPS data is not available; and
wherein said transmission apparatus determines from said OBD system whether an engine of the vehicle is running and transmits said wireless signal in response to determining that the engine is running.

9. A method of claim 8 wherein said input control configuration is effected by software loaded into a memory of said mobile computing device.

10. A method of claim 8 wherein said input control configuration is effected by firmware loaded into a memory of said mobile computing device.

11. A method of claim 8 wherein said input device is a keyboard device.

12. A method of claim 8 wherein said transmission apparatus and said transceiver of said mobile computing device effect automatic bonding.

13. A method of claim 8 wherein said input control configuration is effected by software loaded into a memory of said mobile computing device.

14. A method of claim 8 wherein said input control configuration is effected by firmware loaded into a memory of said mobile computing device.

* * * * *